(12) United States Patent
Cheung et al.

(10) Patent No.: US 9,774,874 B2
(45) Date of Patent: Sep. 26, 2017

(54) TRANSCODING MANAGEMENT TECHNIQUES

(71) Applicant: Intel Corporation, Santa Clara, CA (US)

(72) Inventors: Kin-Hang Cheung, San Jose, CA (US); Devadutta Ghat, Sunnyvale, CA (US)

(73) Assignee: INTEL CORPORATION, Santa Clara, CA (US)

( * ) Notice: Subject to any disclaimer, the term of this patent is extended or adjusted under 35 U.S.C. 154(b) by 446 days.

(21) Appl. No.: 13/871,764

(22) Filed: Apr. 26, 2013

(65) Prior Publication Data

US 2014/0321554 A1    Oct. 30, 2014

(51) Int. Cl.
*H04N 19/40* (2014.01)
*H04N 19/436* (2014.01)
*H04N 19/30* (2014.01)

(52) U.S. Cl.
CPC ........... *H04N 19/40* (2014.11); *H04N 19/395* (2014.11); *H04N 19/436* (2014.11)

(58) Field of Classification Search
CPC ..... H04N 19/40; H04N 19/395; H04N 19/436
USPC ............................ 375/240, 240.02, 240.26
See application file for complete search history.

(56) References Cited

U.S. PATENT DOCUMENTS

| 7,595,743 B1 * | 9/2009 | Winger et al. ................ 341/107 |
| 2012/0191876 A1 * | 7/2012 | Johnson et al. ............. 709/246 |
| 2013/0049998 A1 * | 2/2013 | English et al. ................ 341/51 |

* cited by examiner

*Primary Examiner* — William C Vaughn, Jr.
*Assistant Examiner* — Jae N Noh

(57) ABSTRACT

Techniques for managing the assignment of transcoding tasks to transcoding nodes in a transcoding system are described. In one embodiment, for example, an apparatus may comprise circuitry and a transcoding management module for execution on the circuitry to assign a transcoding task to one of a set of transcoding nodes based on a set of task characteristics of the transcoding task and a set of efficiency values for the set of transcoding nodes, each of the set of efficiency values corresponding to a respective one of the set of transcoding nodes. Other embodiments are described and claimed.

14 Claims, 8 Drawing Sheets

| Task | Task Type | Node | Other Performed Tasks | Collective Task Types | Engine 1 Utilization | Engine 2 Utilization |
|---|---|---|---|---|---|---|
| 1 | A | I | 2 | A, B | 90 | 80 |
| 2 | B | I | 1 | A, B | 90 | 80 |
| 3 | A | II | 4 | A, C | 95 | 95 |
| 4 | C | II | 3 | A, C | 95 | 95 |
| 5 | B | III | 6 | B, C | 80 | 75 |
| 6 | C | III | 5 | B, C | 80 | 75 |

| Task Type | Resident Task Type | Utilization Value |
|---|---|---|
| A | B | 85 |
| A | C | 95 |
| B | A | 85 |
| B | C | 77.5 |
| C | A | 95 |
| C | B | 77.5 |

TRANSCODING MANAGEMENT TECHNIQUES

BACKGROUND

With respect to video and/or audio data, transcoding generally involves changing the encoding format of encoded video and/or audio data. For example, transcoding may involve changing the type of encoding applied to such data, and/or changing the resolution or fidelity of such data. In some cases, transcoding tasks may involve a series of operations, where particular operations within the series are performed by different processing engines. Moreover, different types of transcoding tasks may make differing demands on the processing engines of a transcoding system. In a cloud-based transcoding environment, a transcoding management node may receive transcoding tasks and distribute them to various transcoding nodes. The efficiency of each transcoding node in the transcoding system may depend on the extent to which the utilization of the processing engines therein is maximized.

BRIEF DESCRIPTION OF THE DRAWINGS

FIG. 4 illustrates one embodiment of a performance information table.

FIG. 5 illustrates one embodiment of a decision information table.

DETAILED DESCRIPTION

Various embodiments may be generally directed to techniques for managing the assignment of transcoding tasks to transcoding nodes in a transcoding system. In one embodiment, for example, an apparatus may comprise circuitry and a transcoding management module for execution on the circuitry to assign a transcoding task to one of a set of transcoding nodes based on a set of task characteristics of the transcoding task and a set of efficiency values for the set of transcoding nodes, each of the set of efficiency values corresponding to a respective one of the set of transcoding nodes. Other embodiments may be described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Figure 1:
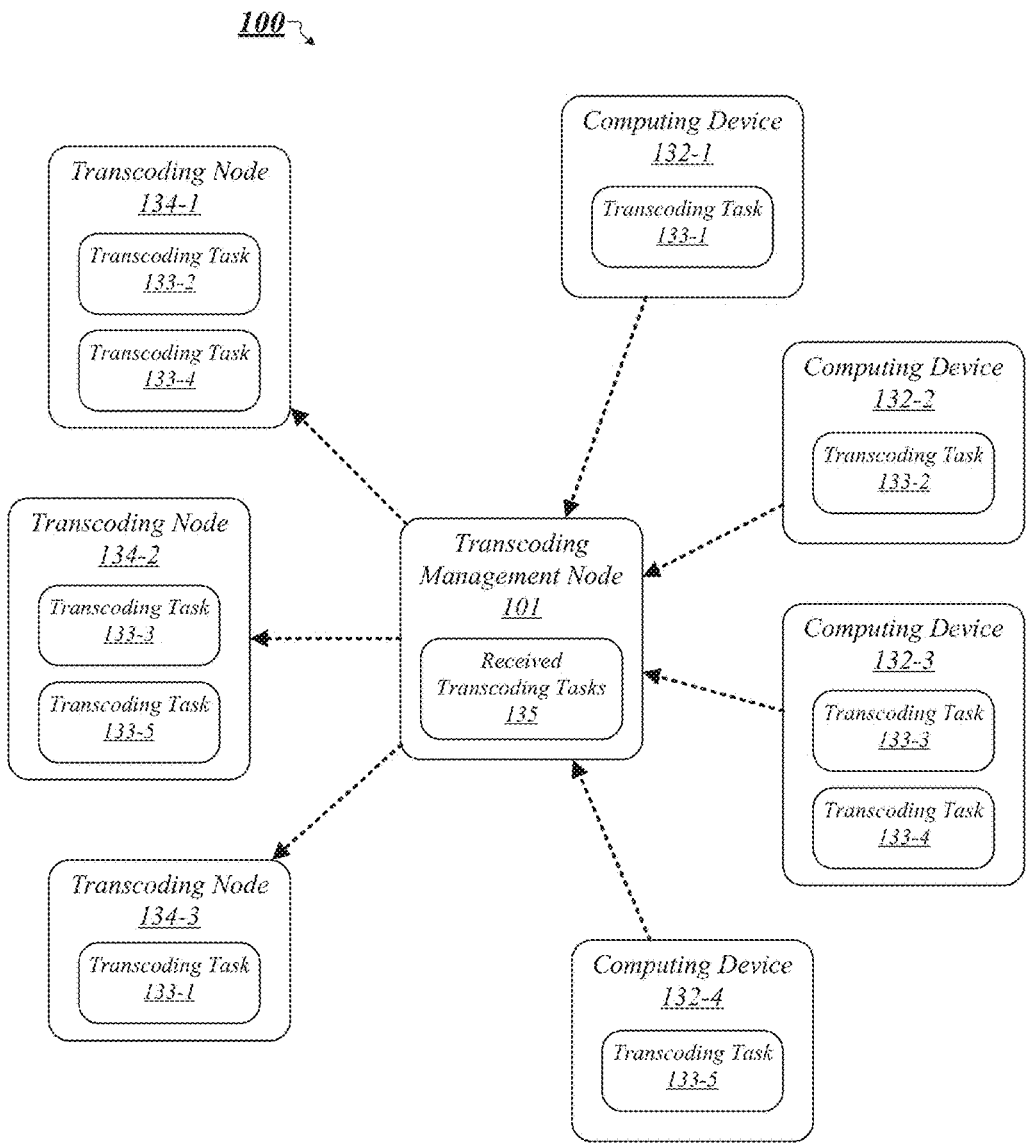
FIG. 1 illustrates one embodiment of an operating environment.

FIG. 1 illustrates an example of an operating environment 100 according to some embodiments. As shown in FIG. 1, a transcoding management node 101 receives various transcoding tasks 133-$j$ from various computing devices 132-$i$, and assigns those transcoding tasks 133-$j$ to various transcoding nodes 134-$k$. It is worthy of note that "i," "j," "k," and similar designators as used herein are intended to be variables representing any positive integer. Thus, for example, if an implementation sets a value for i=4, then a complete set of computing devices 132-$i$ may include computing devices 132-1, 132-2, 132-3, and 132-4, such as is the case in the example of FIG. 1. As used herein, the term "set" refers to a group of one or more. As shown in FIG. 1, transcoding management node 101 receives transcoding task 133-1 from computing device 132-1, receives transcoding task 133-2 from computing device 132-2, receives transcoding tasks 133-3 and 133-4 from computing device 132-3, and receives transcoding task 133-5 from computing device 132-4. Transcoding management node 101 then assigns the various transcoding tasks among its received transcoding tasks 135 to various transcoding nodes 134-$k$. More particularly, transcoding management node 101 assigns transcoding tasks 133-2 and 133-4 to transcoding node 134-1, assigns transcoding tasks 133-3 and 133-5 to transcoding node 134-2, and assigns transcoding task 133-1 to transcoding node 134-3.

It is worthy of note that in various embodiments such as may be illustrated by the example operating environment 100 of FIG. 1, a particular computing device may be operative to send more than one transcoding task to a transcoding management node. For example, in FIG. 1, computing device 132-3 is operative to send both transcoding task 133-3 and transcoding task 133-4 to transcoding management node 101. It is further worthy of note that in some embodiments such as may be illustrated by the example operating environment 100 of FIG. 1, a transcoding management node may be operative to assign more than one transcoding task to a particular transcoding node, and such multiple transcoding tasks need not necessarily originate from the same computing device. For example, in FIG. 1, transcoding management node 101 assigns both transcoding task 133-2 and 133-4 to transcoding node 134-1, and these transcoding tasks originate from computing devices 132-2 and 132-3 respectively. The embodiments are not limited to these examples.

In various embodiments, particular transcoding tasks such as transcoding tasks 133-$j$ of FIG. 1 may comprise multiple operations to be performed. In some embodiments, particular operations may require that other operations be completed before they can commence. For example, a particular transcoding task may comprise first, second, and third operations, the second operation may be unable to commence until completion of the first operation, and the third operation may be unable to commence until completion of the second operation. In various embodiments, particular transcoding nodes such as 134-$k$ of FIG. 1 may comprise multiple transcoding engines. In some embodiments, a given transcoding node comprising multiple transcoding engines may be operative to perform different operations of a transcoding task on different transcoding engines. Continuing with the example of a transcoding task comprising first, second, and third operations, a transcoding node comprising transcoding engines "A" and "B" may be operative to process the first operation on transcoding engine A, then process the second operation on transcoding engine B, and then process the third operation on transcoding engine A. The embodiments are not limited to these examples.

Figure 2A:
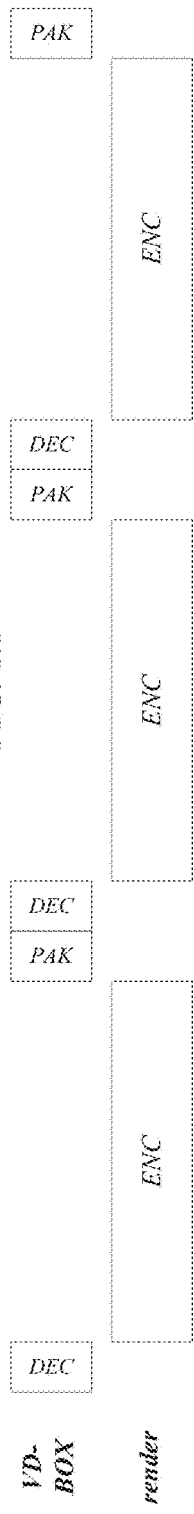
FIG. 2A illustrates one embodiment of a first transcoding task.

FIG. 2A illustrates an example of a first transcoding task 200 that comprises multiple operations and is performed by a transcoding node comprising multiple processing engines. More particularly, FIG. 2A illustrates the operations performed by the processing engines "VDBOX" and "render" in conjunction with performance of the transcoding task 200 by Intel® Quick Sync Video (QSV) transcoding circuitry. In various embodiments, transcoding task 200 may comprise an example of a 1080p to 1080p (HD to HD) video transcoding task. As shown in FIG. 2A, the transcoding task 200 comprises decode (DEC), encode (ENC), and pack (PAK) operations. For each portion of data, the ENC operation cannot commence until the DEC operation completes, and the PAK operation cannot commence until the ENC operation completes. Moreover, the DEC and PAK operations are performed by the VDBOX engine, while the ENC operations are performed by the render engine. As is evident in FIG. 2A, when transcoding task 200 is performed, the utilization of the render engine is relatively high but the utilization of the VDBOX engine is relatively low. In other words, the VDBOX engine is idle the majority of the time, while the render engine is in use the majority of the time. It is to be understood that although the nomenclature and features associated with QSV transcoding circuitry are employed in FIG. 2A as an example, the embodiments are not so limited. Embodiments are both possible and contemplated in which other types of transcoding circuitry, logic, programming, and/or instructions are additionally or alternatively utilized, and the embodiments are not limited in this context.

Figure 2B:
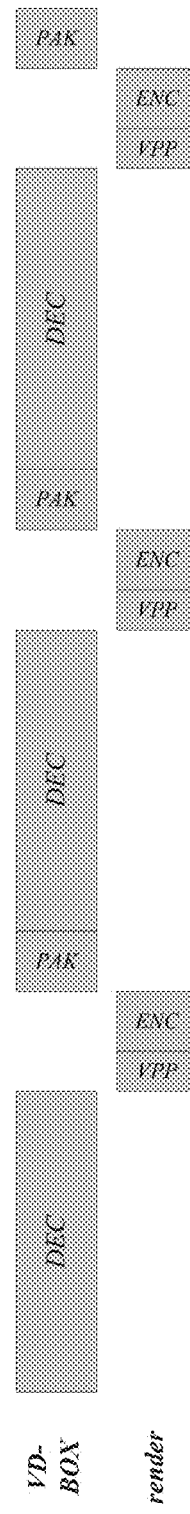
FIG. 2B illustrates one embodiment of a second transcoding task.

FIG. 2B illustrates an example of a second transcoding task 210. More particularly, FIG. 2B illustrates the operations performed by the processing engines "VDBOX" and "render" in conjunction with performance of the transcoding task 210 by QSV transcoding circuitry. In some embodiments, transcoding task 210 may comprise an example of a 1080p to 480p (HD to SD) video transcoding task. As shown in FIG. 2B, the transcoding task 210 comprises decode (DEC), pre-processing (VPP), encode (ENC), and pack (PAK) operations. For each portion of data, the VPP operation cannot commence until the DEC operation completes, the ENC operation cannot commence until the VPP operation completes, and the PAK operation cannot commence until the ENC operation completes. Moreover, the DEC and PAK operations are performed by the VDBOX engine, while the VPP and ENC operations are performed by the render engine. As is evident in FIG. 2B, when transcoding task 210 is performed, the utilization of the VDBOX engine is relatively high but the utilization of the render engine is relatively low. In other words, the render engine is idle the majority of the time, while the VDBOX engine is in use the majority of the time.

Figure 2C:
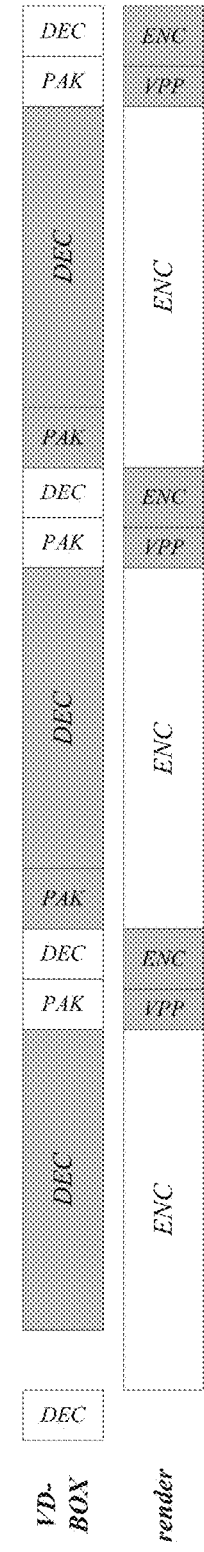
FIG. 2C illustrates one embodiment of a third transcoding task.

FIG. 2C illustrates an example of a joint transcoding task 220 that comprises the simultaneous performance of transcoding task 200 of FIG. 2A and transcoding task 210 of FIG. 2B by QSV transcoding circuitry. More particularly, FIG. 2C illustrates an example of a scenario in which transcoding tasks that place differing demands upon the various transcoding processing engines may be performed simultaneously in order to achieve efficient utilization of those transcoding processing engines. As is evident in FIG. 2C, performing transcoding tasks 200 and 210 simultaneously enables the differing processing engine demands of the two tasks to be exploited in complementary fashion. For example, the large amounts of VDBOX engine idle time associated with transcoding task 200 are utilized to satisfy the large VDBOX engine utilization requirements of transcoding task 210. Similarly, the large amounts of render engine idle time associated with transcoding task 210 are utilized to satisfy the large render engine utilization requirements of transcoding task 200. The embodiments are not limited to these examples.

Returning to FIG. 1, in various embodiments, it may be desirable for transcoding management node 101 to assign received transcoding tasks 135 among transcoding nodes 134-*k* in a fashion that realizes transcoding engine utilization efficiencies such as that illustrated by the example of FIG. 2C. For example, if transcoding management node 101 determines that transcoding task 133-3 and transcoding task 133-5 will yield high transcoding engine utilization efficiency when performed simultaneously on the same transcoding node, it may assign both those transcoding tasks for simultaneous performance on transcoding node 134-2. The embodiments are not limited to this example.

Figure 3:
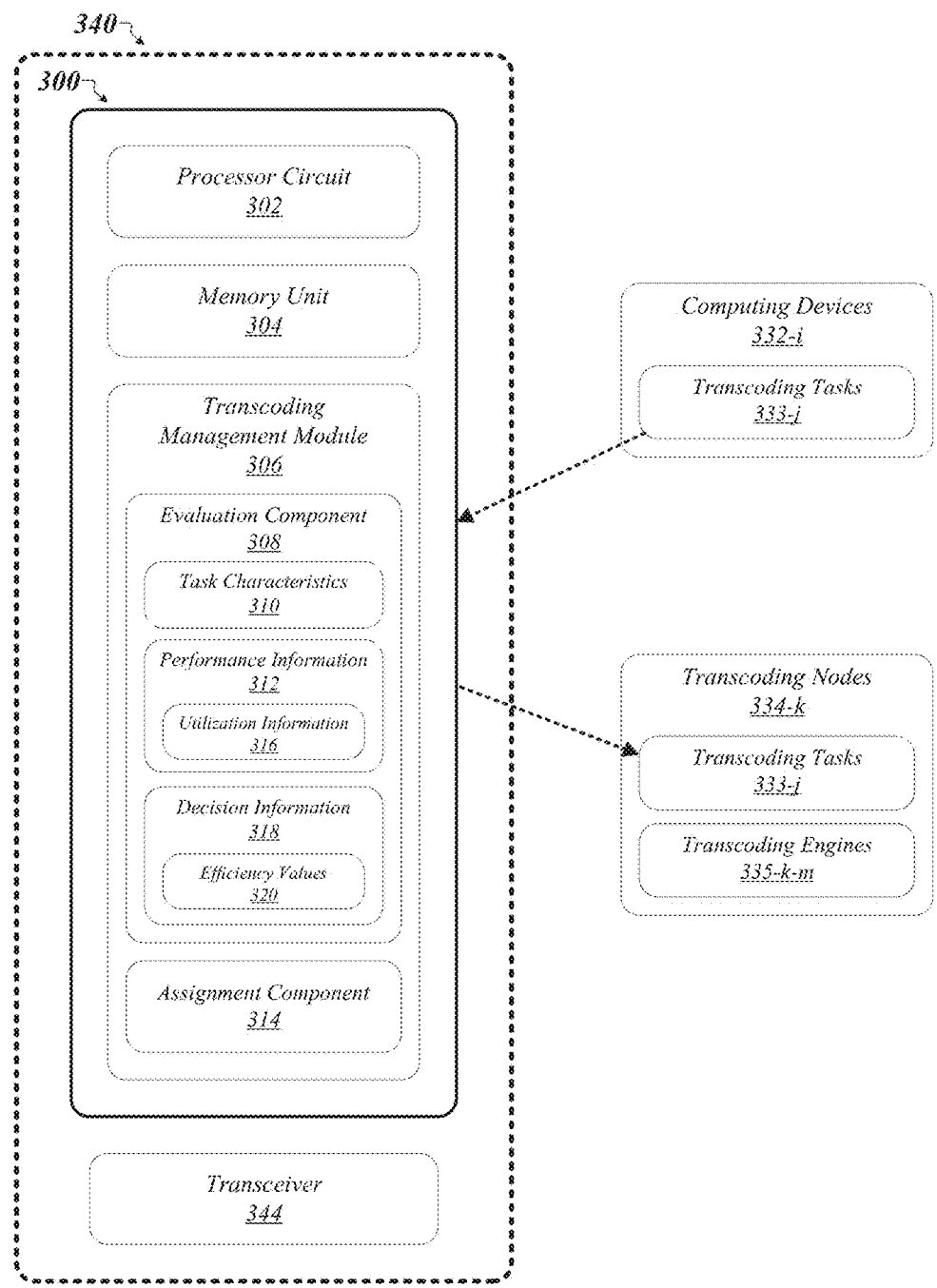
FIG. 3 illustrates one embodiment of an apparatus and one embodiment of a first system.

FIG. 3 illustrates a block diagram of an apparatus 300. Apparatus 300 may comprise an example of a transcoding management node operative to assign transcoding tasks to transcoding nodes in a cloud-based transcoding system, such as transcoding management node 101 of FIG. 1. More particularly, in some embodiments, apparatus 300 may comprise an example of a transcoding management node for a cloud-based transcoding system that is operative to perform assignment of transcoding tasks in a fashion that realizes transcoding engine utilization efficiencies such as that illustrated by the example of FIG. 2C. It is worthy of note that although apparatus 300 may comprise an example of a transcoding management node for a cloud-based transcoding system, the embodiments are not so limited. Embodiments are both possible and contemplated in which an apparatus such as apparatus 300 operates in a transcoding system that is not cloud-based, and the embodiments are not limited in this context.

As shown in FIG. 3, apparatus 300 comprises multiple elements including a processor circuit 302, a memory unit 304, and a transcoding management module 306. The embodiments, however, are not limited to the type, number, or arrangement of elements shown in this figure.

In various embodiments, apparatus 300 may comprise processor circuit 302. Processor circuit 302 may be implemented using any processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). Processor circuit 302 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In one embodiment, for example, processor circuit 302 may be implemented as a general purpose processor, such as a processor made by Intel® Corporation, Santa Clara, Calif. The embodiments are not limited in this context.

In some embodiments, apparatus 300 may comprise or be arranged to communicatively couple with a memory unit 304. Memory unit 304 may be implemented using any machine-readable or computer-readable media capable of storing data, including both volatile and non-volatile memory. For example, memory unit 304 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy of note that some portion or all of memory unit 304 may be included on the same integrated circuit as processor circuit 302, or alternatively some portion or all of memory unit 304 may be disposed on an integrated circuit or other medium, for example a hard disk drive, that is external to the integrated circuit of processor circuit 302. Although memory unit 304 is comprised within apparatus 300 in FIG. 3, memory unit 304 may be external to apparatus 300 in some embodiments. The embodiments are not limited in this context.

In various embodiments, apparatus 300 may comprise transcoding management module 306. Transcoding management module 306 may comprise any combination of circuitry, logic, and/or instructions operative to manage the assignment of transcoding tasks to transcoding nodes in a transcoding system. For example, in some embodiments, transcoding management module 306 may comprise a stand-alone transcoding management chip or transcoding management circuitry comprised within processor circuit 302, while in various embodiments, transcoding management module 306 may comprise logic and/or instructions for execution by processor circuit 302. The embodiments are not limited to these examples.

FIG. 3 also illustrates a block diagram of a system 340. System 340 may comprise any of the aforementioned elements of apparatus 300. System 340 may further comprise a transceiver 344. Transceiver 344 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, transceiver 344 may operate in accordance with one or more applicable standards in any version. The embodiments are not limited in this context.

In general operation, apparatus 300 and/or system 340 may be operative to assign transcoding tasks to transcoding nodes in a transcoding system. In some such embodiments, apparatus 300 and/or system 340 may be operative to track the performance of the transcoding nodes in the system to obtain performance information, and to assign transcoding tasks to transcoding nodes based on this performance information in order to realize transcoding engine utilization efficiencies. For example, apparatus 300 and/or system 340 may be operative to assign transcoding tasks 133-$j$ to transcoding nodes 134-$k$ so as to realize transcoding engine utilization efficiencies. The embodiments are not limited in this context.

In various embodiments, apparatus 300 and/or system 340 may be operative to receive transcoding tasks 333-$j$ from one or more computing devices 332-$i$. In some embodiments, transcoding tasks 333-$j$ may comprise video and/or audio transcoding tasks. In various embodiments, transcoding tasks 333-$j$ may comprise Quick Sync Video transcoding tasks, and apparatus 300 and/or system 340 may comprise a Quick Sync Video transcoding management node. The embodiments are not limited in this context.

In some embodiments, transcoding management module 306 may comprise evaluation component 308. In various embodiments, evaluation component 308 may be operative to determine one or more task characteristics 310 for transcoding tasks 333-$j$. In some embodiments, task characteristics 310 may comprise logic, data, information, and/or instructions describing characteristics of the data corresponding to the various transcoding tasks 333-$j$, and/or describing characteristics of the transcoding operations to be performed for the various transcoding tasks 333-$j$. For example, in various embodiments in which transcoding tasks 333-$j$ comprise video transcoding tasks, task characteristics 310 may indicate pre-transcoding and post-transcoding resolutions and/or bit rates for the video to be transcoded in each task. In some embodiments, upon receipt of each transcoding task 333-$j$, evaluation component 308 may be operative to determine task characteristics 310 for that transcoding task 333-$j$ and to create an entry in performance information 312 corresponding to the transcoding task 333-$j$ and comprising the task characteristics 310 for the transcoding task 333-$j$. Performance information 312 may comprise logic, data, information, and/or instructions identifying transcoding tasks 333-$j$ that have been assigned by apparatus 300 and/or system 340 and specifying characteristics of those transcoding tasks 333-$j$. In various embodiments, for example, performance information 312 may comprise a table, matrix, array, or other data structure used to track the assigned transcoding tasks 333-$j$. The embodiments are not limited in this context.

Hereinafter, for ease of explanation, the term "task type" shall be employed with respect to any particular transcoding task 333-$j$ to connote the subset of task characteristics 310 for that transcoding task 333-$j$ that are pertinent indicators of the processing requirements imposed upon transcoding nodes and/or transcoding engines that process that transcoding task 333-$j$. According to this convention, two transcoding tasks 333-$j$ may be described herein as being of the same "type" if their processing involves performance of the same operations and incurrence of the same loads by the transcoding engines of the transcoding system. Two transcoding tasks 333-$j$ may be of the same type even if they differ in one or many ways with respect to their task characteristics 310, as long as these differences do not indicate differences in the transcoding operations or loads associated with the tasks.

In some embodiments, transcoding management module 306 may comprise assignment component 314. In various embodiments, assignment component 314 may be operative to assign each transcoding task 333-$j$ to a transcoding node 334-$k$. In some embodiments, once assignment component 314 has assigned a particular transcoding task 333-$j$ to a transcoding node 334-$k$, it may be operative to notify evaluation component 308 of the assignment. Evaluation component 308 may then be operative to update the entry in performance information 312 that corresponds to that transcoding task 333-$j$, such that the entry identifies the transcoding node 334-k to which the task has been assigned. In various embodiments, evaluation component 308 may also be operative to update the entry for that transcoding task 333-j to identify other transcoding tasks 333-j that are being performed on its assigned node, and/or to update entries for those other transcoding tasks 333-j to indicate that the particular transcoding task 333-j is being performed on their assigned node. The embodiments are not limited in this context.

In some embodiments, evaluation component 308 may be operative to track the performance of the various transcoding nodes 334-k to determine utilization information 316. In various embodiments, utilization information 316 may comprise logic, data, information, and/or instructions indicating the utilization levels of transcoding nodes 334-k. More particularly, in some embodiments in which each of transcoding nodes 334-k comprises multiple transcoding engines 335-k-m across which transcoding tasks 333-j are divided, utilization information 316 may indicate the utilization levels of the various transcoding engines 335-k-m within each transcoding node 334-k. For example, in an embodiment in which a transcoding node 334-1 comprises a Quick Sync Video transcoding node, utilization information 316 may indicate a utilization level for a transcoding engine 334-1-1 comprising a VDBOX engine of the transcoding node 334-1 and a utilization level for a transcoding engine 334-1-1 comprising a render engine of the transcoding node 334-1. The embodiments are not limited to this example.

In various embodiments, evaluation component 308 may be operative to supplement performance information 312 with utilization information 316. More particularly, evaluation component 308 may be operative to add the utilization information 316 for any particular transcoding node 334-k to the performance information 312 corresponding to the transcoding tasks 333-j being performed on that transcoding node 334-k. Continuing with the above example of a transcoding node 334-1 that comprises a Quick Sync Video transcoding node, if the transcoding node 334-1 processes transcoding tasks 333-1, 333-2, and 333-3, evaluation component 308 may be operative to modify the performance information 312 for transcoding tasks 333-1, 333-2, and 333-3 to indicate the VDBOX engine and render engine utilization levels realized by the simultaneous performance of those tasks on the transcoding node 334-1. The embodiments are not limited to this example.

In some embodiments, evaluation component 308 may be operative to create multiple entries in performance information 312 for any particular transcoding task 333-j. More particularly, for a given transcoding task 333-j undergoing performance at a particular transcoding node 334-k, evaluation component 308 may be operative to create a new entry for the transcoding task 333-j in performance information 312 if a change occurs in the set of other transcoding tasks that are also being performed at that transcoding node 334-k. For example, if assignment component 314 assigns a transcoding task 333-1 to a previously unused transcoding node 334-1, evaluation component 308 may be operative to create an entry for the transcoding task 333-1 in performance information 312, and to update that entry with utilization information 316 corresponding to sole performance of the transcoding task 333-1 at the transcoding node 334-1. If assignment component 314 then assigns a transcoding task 333-2 to the transcoding node 334-1, evaluation component 308 may be operative to create a second entry in performance information 312 for the transcoding task 333-1 as well as an entry for the transcoding task 333-2, and to update those entries with utilization information 316 corresponding to simultaneous performance of the transcoding tasks 333-1 and 333-2 at the transcoding node 334-1. The embodiments are not limited to these examples.

In various embodiments, by accumulating utilization information 316 that indicates the empirical transcoding engine utilization levels achieved by simultaneous performance of various combinations of transcoding tasks 333-j, evaluation component 308 may enable assignment component 314 to perform assignments of subsequent transcoding tasks 333-j in such a fashion as to realize increases in utilization efficiency. In an example embodiment, evaluation component 308 may accumulate utilization information 316 that indicates that a relatively high utilization efficiency is achieved when a transcoding task of a type "A" and a transcoding task of a type "B" are performed simultaneously on a transcoding node. In such an example embodiment, if transcoding management module 306 then receives a transcoding task 333-1 of type A for assignment, it may assign that transcoding task 333-1 to a transcoding node 334-1 on which a transcoding task 333-2 of type B is undergoing performance. The embodiments are not limited in this context.

When apparatus 300 and/or system 340 first commences operation in a particular transcoding system such as that illustrated in example operating environment 100 of FIG. 1, it may lack utilization information 316 on which to base decisions regarding the assignments of incoming transcoding tasks 333-j. As such, apparatus 300 and/or system 340 may initially operate in a learning mode. During the learning mode, assignment component 314 may be operative to randomly assign transcoding tasks 333-j to transcoding nodes 334-k, and evaluation component 308 may be operative to accumulate utilization information 316 for the transcoding task combinations resulting from these random assignments. A period during which apparatus 300 and/or system 340 operates in the learning mode may be referred to as a learning phase.

Once evaluation component 308 has accumulated sufficient utilization information 316 to make informed decisions regarding efficient assignment of transcoding tasks 333-j to transcoding nodes 334-k, apparatus 300 and/or system 340 may exit the learning mode and enter an intelligent assignment mode during which transcoding task assignments are performed based on the utilization information 316. A period during which apparatus 300 and/or system 340 operates in the intelligent assignment mode may be referred to as an intelligent assignment phase. The amount of time required for apparatus 300 and/or system 340 to accumulate sufficient utilization information 316 to commence the intelligent assignment phase may depend on the rate at which it receives transcoding tasks 333-j during the learning mode. If apparatus 300 and/or system 340 receives transcoding tasks 333-j relatively frequently, it may accumulate sufficient utilization information 316 and exit learning mode relatively quickly. If apparatus 300 and/or system 340 receives transcoding tasks 333-j relatively infrequently, on the other hand, it may need to remain in learning mode for a longer period of time in order to accumulate sufficient utilization information 316. The amount of time required for apparatus 300 and/or system 340 to accumulate sufficient utilization information 316 may also depend on the number of relevant task characteristics 310 with respect to which the various received transcoding tasks 333-j differ from each other. The greater the number of relevantly distinct transcoding task types, the greater the number of task combination permutations for which evaluation component 308 may need to collect utilization information 316 before learning mode can be terminated. The embodiments are not limited in this context.

While in the intelligent assignment mode in some embodiments, upon receiving a particular transcoding task 333-$j$ featuring particular task characteristics 310, evaluation component 308 may be operative to generate decision information 318 for that transcoding task 333-$j$ based on its task characteristics 310. In various embodiments, decision information 318 may comprise logic, data, information, and/or instructions usable by evaluation component 308 to select a transcoding node 334-$k$ for a transcoding task 333-$j$. In some embodiments, evaluation component 308 may be operative to query performance information 312 for entries corresponding to transcoding tasks with characteristics that match the task characteristics 310 of the received transcoding task 333-$j$. Such entries may comprise utilization information 316 describing the empirical results achieved when transcoding tasks with matching characteristics were performed in combination with transcoding tasks of various other types. Evaluation component 308 may then be operative to generate decision information 318 based on the identified entries in performance information 312. The embodiments are not limited in this context.

In various embodiments, evaluation component 308 may be operative to generate decision information 318 comprising efficiency values 320. In some embodiments, each efficiency value 320 may indicate a utilization level associated with the combination of a transcoding task of the same type as the received transcoding task with transcoding tasks of various other types. In various embodiments, evaluation component 308 may be operative to determine a set of efficiency values 320 for a set of transcoding nodes 334-$k$ based on one or more task characteristics 310 and on utilization information 316. In some such embodiments, each efficiency value 320 may comprise a composite value corresponding to a respective one of the set of transcoding nodes 334-$k$ and determined based on multiple elements of utilization information 316, where each such element of utilization information 316 describes the utilization of a different transcoding engine. For example, with respect a Quick Sync Video transcoding system, each efficiency value 320 may comprise an average of a utilization level for the VDBOX engine and a utilization level for the render engine. In various embodiments, evaluation component 308 may be operative to query performance information 312 to determine the combinations of transcoding tasks 333-$j$ currently being performed on transcoding nodes 334-$k$, and may then generate efficiency values 320 only for the task combinations corresponding to the prospective assignment of the incoming transcoding task 333-$j$ to each of the various transcoding nodes 334-$k$. The embodiments are not limited in this context.

In some embodiments, assignment component 314 may be operative to select one of the set of transcoding nodes 334-$k$ for the incoming transcoding task 333-$j$ based on the generated set of efficiency values 320. In various embodiments, assignment component 314 may be operative to identify the transcoding node 334-$k$ corresponding to the highest efficiency value 320, and assign the incoming transcoding task 333-$j$ to that transcoding node 334-$k$. The embodiments are not limited in this context.

FIG. 4 illustrates an example of a performance information table 400 such as may comprise performance information 312 generated by evaluation component 308 of FIG. 3. As shown in FIG. 4, entries for each of tasks 1 to 6 indicate the types of those tasks, the nodes to which those tasks have been assigned, the identities of other tasks assigned to the same nodes, and collective task types of all tasks assigned to those nodes, and the utilization levels of respective transcoding engines 1 and 2 at each node. In some embodiments, based on information such as that in performance information table 400, evaluation component 308 of FIG. 3 may be operative to determine the transcoding engine utilization levels associated with various combinations of task types. For example, the first entry in performance information table 400 indicates that when tasks of respective types A and B have been simultaneously performed on node I, the resulting utilization levels for transcoding engines 1 and 2 have been 90 and 80 percent, respectively. Similarly, the fifth entry in performance information table 400 indicates that when tasks of respective types B and C have been simultaneously performed on node III, the resulting utilization levels for transcoding engines 1 and 2 have been 80 and 75 percent, respectively. The embodiments are not limited to these examples.

FIG. 5 illustrates an example of a decision information table 500 such as may comprise decision information 318 generated by evaluation component 308 of FIG. 3. Each entry in decision information table 500 indicates a task type of a transcoding task for assignment, a task type of a resident transcoding task on a prospective transcoding node, and a utilization value associated with the combination of transcoding tasks of the task type and resident task type. For example, the third entry in decision information table 500 of FIG. 5 indicates that if a transcoding task of type B is assigned to a transcoding node upon which a transcoding task of type A is already undergoing performance, a utilization value of 85 may be expected to result. In various embodiments, based on information such as that in decision information table 500 of FIG. 5, evaluation component 308 of FIG. 3 may be operative to determine a transcoding node to which to assign a particular transcoding task in order to achieve a greatest utilization value. For example, if evaluation component 308 receives a transcoding task 133-1 for assignment that is of type B, it may consult decision information such as that in decision information table 500 to determine that a utilization value of 85 is associated with combining transcoding tasks of types A and B, while a utilization value of 77.5 is associated with combining transcoding tasks of types B and C. Evaluation component 308 may then assign the type B transcoding task such as to combine it with a type A transcoding task, rather than a type C transcoding task, based on the greater utilization value associated with the combination of type A and type B transcoding tasks. The embodiments are not limited to this example.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 6:
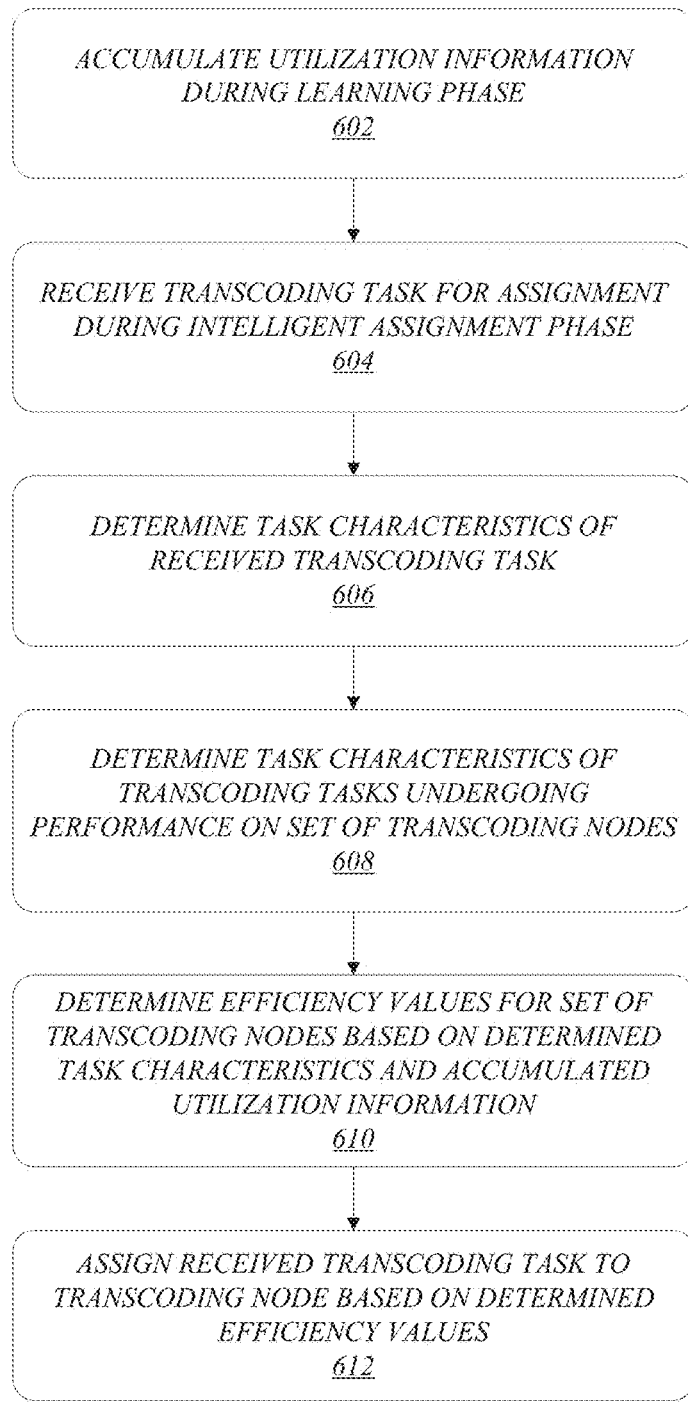
FIG. 6 illustrates one embodiment of a logic flow.

FIG. 6 illustrates one embodiment of a logic flow 600, which may be representative of the operations executed by one or more embodiments described herein. As shown in logic flow 600, utilization information may be accumulated during a learning phase at 602. For example, evaluation component 306 of FIG. 3 may accumulate utilization information 316 during a learning phase. At 604, a transcoding task may be received for assignment during an intelligent assignment phase. For example, apparatus 300 and/or system 340 of FIG. 3 may receive a transcoding task 333-j for assignment during the intelligent assignment phase. At 606, task characteristics of the received transcoding task may be determined. For example, evaluation component 308 of FIG. 3 may determine task characteristics 310 of the received transcoding task 333-j. At 608, task characteristics of transcoding tasks undergoing performance on a set of transcoding nodes may be determined. For example, evaluation component 308 of FIG. 3 may determine task characteristics 310 of other transcoding tasks 333-j undergoing performance on transcoding nodes 334-k. At 610, efficiency values may be determined for the set of transcoding nodes based on the determined task characteristics and the accumulated utilization information. For example, evaluation component 308 of FIG. 3 may determine efficiency values 320 based on the determined task characteristics 310 and the accumulated utilization information 316. At 612, the received transcoding task may be assigned to a transcoding node based on the determined efficiency values. For example, assignment component 314 of FIG. 3 may assign the received transcoding task 333-j to a transcoding node 334-k based on the determined efficiency values 320. The embodiments are not limited to these examples.

Figure 7:
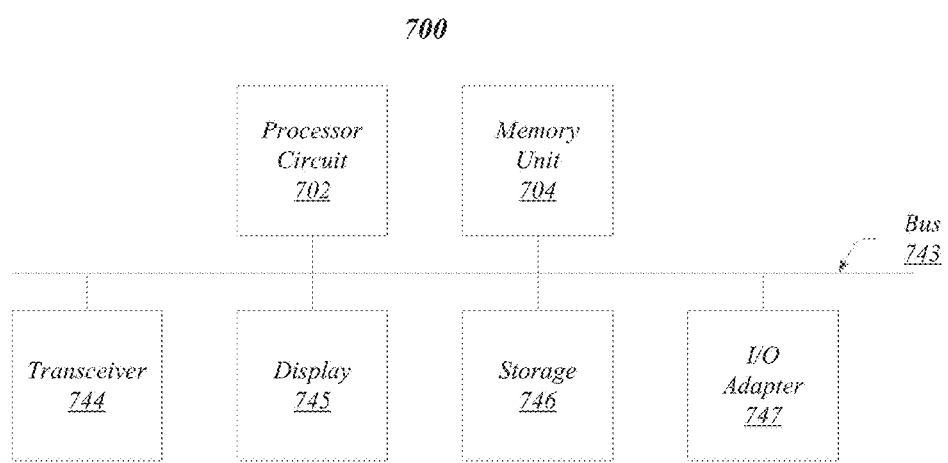
FIG. 7 illustrates one embodiment of a second system.

FIG. 7 illustrates one embodiment of a system 700. In various embodiments, system 700 may be representative of a system or architecture suitable for use with one or more embodiments described herein, such as apparatus 300 and/or system 340 of FIG. 3, and/or logic flow 600 of FIG. 6. The embodiments are not limited in this respect.

As shown in FIG. 7, system 700 may include multiple elements. One or more elements may be implemented using one or more circuits, components, registers, processors, software subroutines, modules, or any combination thereof, as desired for a given set of design or performance constraints. Although FIG. 7 shows a limited number of elements in a certain topology by way of example, it can be appreciated that more or less elements in any suitable topology may be used in system 700 as desired for a given implementation. The embodiments are not limited in this context.

In various embodiments, system 700 may include a processor circuit 702. Processor circuit 702 may be implemented using any processor or logic device, and may be the same as or similar to processor circuit 302 of FIG. 3.

In one embodiment, system 700 may include a memory unit 704 to couple to processor circuit 702. Memory unit 704 may be coupled to processor circuit 702 via communications bus 743, or by a dedicated communications bus between processor circuit 702 and memory unit 704, as desired for a given implementation. Memory unit 704 may be implemented using any machine-readable or computer-readable media capable of storing data, including both volatile and non-volatile memory, and may be the same as or similar to memory unit 304 of FIG. 3. In some embodiments, the machine-readable or computer-readable medium may include a non-transitory medium. The embodiments are not limited in this context.

In various embodiments, system 700 may include a transceiver 744. Transceiver 744 may include one or more radios capable of transmitting and receiving signals using various suitable wireless communications techniques, and may be the same as or similar to transceiver 344 of FIG. 3.

In various embodiments, system 700 may include a display 745. Display 745 may comprise any display device capable of displaying information received from processor circuit 702. Examples for display 745 may include a television, a monitor, a projector, and a computer screen. In one embodiment, for example, display 745 may be implemented by a liquid crystal display (LCD), light emitting diode (LED) or other type of suitable visual interface. Display 745 may comprise, for example, a touch-sensitive color display screen. In various implementations, display 745 may comprise one or more thin-film transistors (TFT) LCD including embedded transistors. The embodiments are not limited in this context.

In various embodiments, system 700 may include storage 746. Storage 746 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 746 may include technology to increase the storage performance enhanced protection for valuable digital media when multiple hard drives are included, for example. Further examples of storage 746 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

In various embodiments, system 700 may include one or more I/O adapters 747. Examples of I/O adapters 747 may include Universal Serial Bus (USB) ports/adapters, IEEE 1394 Firewire ports/adapters, and so forth. The embodiments are not limited in this context.

Figure 8:
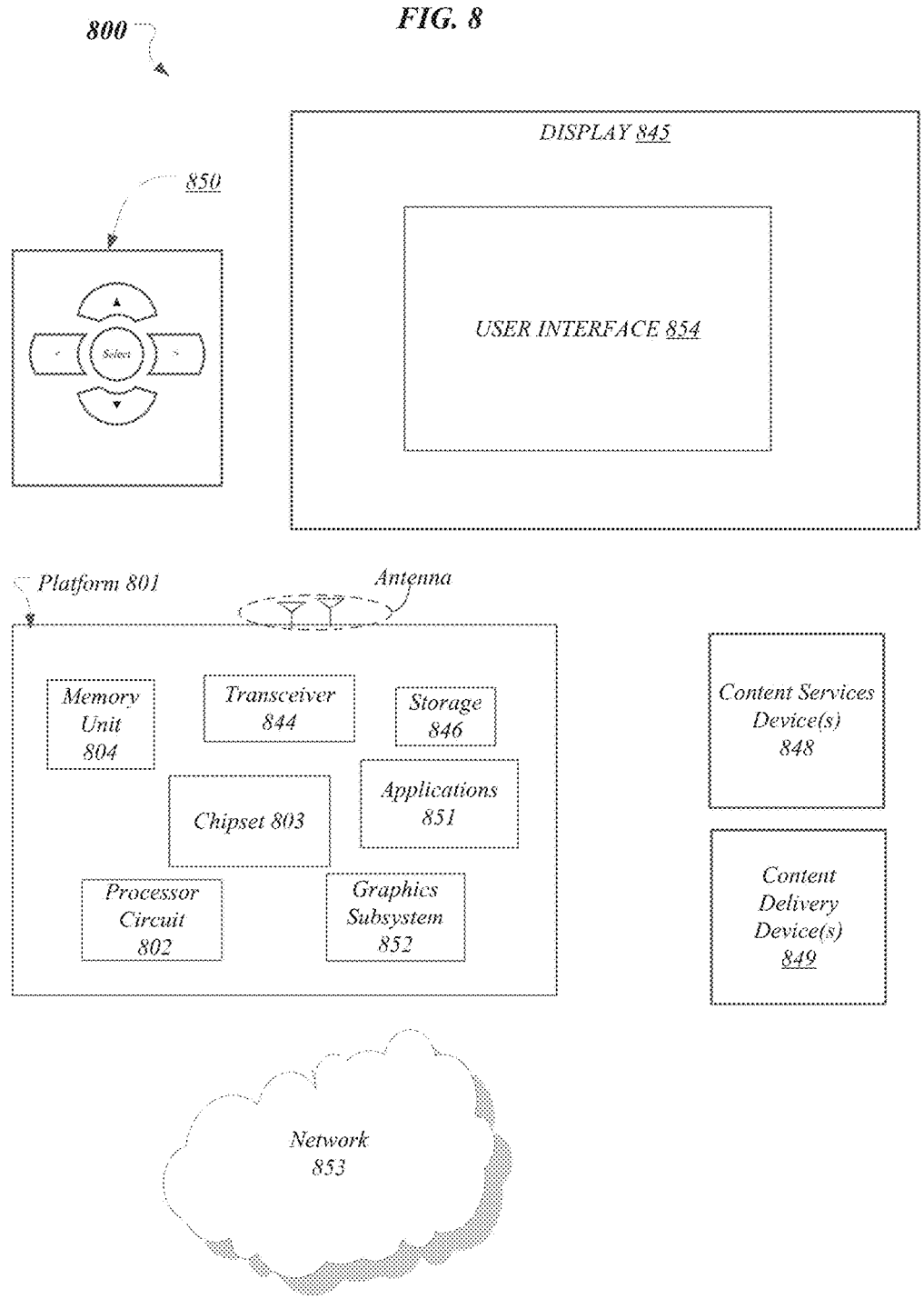
FIG. 8 illustrates one embodiment of a third system.

FIG. 8 illustrates an embodiment of a system 800. In various embodiments, system 800 may be representative of a system or architecture suitable for use with one or more embodiments described herein, such as apparatus 300 and/or system 340 of FIG. 3, logic flow 600 of FIG. 6, and/or system 700 of FIG. 7. The embodiments are not limited in this respect.

As shown in FIG. 8, system 800 may include multiple elements. One or more elements may be implemented using one or more circuits, components, registers, processors, software subroutines, modules, or any combination thereof, as desired for a given set of design or performance constraints. Although FIG. 8 shows a limited number of elements in a certain topology by way of example, it can be appreciated that more or less elements in any suitable topology may be used in system 800 as desired for a given implementation. The embodiments are not limited in this context.

In embodiments, system 800 may be a media system although system 800 is not limited to this context. For example, system 800 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 800 includes a platform 801 coupled to a display 845. Platform 801 may receive content from a content device such as content services device(s) 848 or content delivery device(s) 849 or other similar content sources. A navigation controller 850 including one or more navigation features may be used to interact with, for example, platform 801 and/or display 845. Each of these components is described in more detail below.

In embodiments, platform 801 may include any combination of a processor circuit 802, chipset 803, memory unit 804, transceiver 844, storage 846, applications 851, and/or graphics subsystem 852. Chipset 803 may provide intercommunication among processor circuit 802, memory unit 804, transceiver 844, storage 846, applications 851, and/or graphics subsystem 852. For example, chipset 803 may include a storage adapter (not depicted) capable of providing intercommunication with storage 846.

Processor circuit 802 may be implemented using any processor or logic device, and may be the same as or similar to processor circuit 702 in FIG. 7.

Memory unit 804 may be implemented using any machine-readable or computer-readable media capable of storing data, and may be the same as or similar to memory unit 704 in FIG. 7.

Transceiver 844 may include one or more radios capable of transmitting and receiving signals using various suitable wireless communications techniques, and may be the same as or similar to transceiver 744 in FIG. 7.

Display 845 may include any television type monitor or display, and may be the same as or similar to display 745 in FIG. 7.

Storage 846 may be implemented as a non-volatile storage device, and may be the same as or similar to storage 746 in FIG. 7.

Graphics subsystem 852 may perform processing of images such as still or video for display. Graphics subsystem 852 may be a graphics processing unit (GPU) or a visual processing unit (VPU), for example. An analog or digital interface may be used to communicatively couple graphics subsystem 852 and display 845. For example, the interface may be any of a High-Definition Multimedia Interface, DisplayPort, wireless HDMI, and/or wireless HD compliant techniques. Graphics subsystem 852 could be integrated into processor circuit 802 or chipset 803. Graphics subsystem 852 could be a stand-alone card communicatively coupled to chipset 803.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

In embodiments, content services device(s) 848 may be hosted by any national, international and/or independent service and thus accessible to platform 801 via the Internet, for example. Content services device(s) 848 may be coupled to platform 801 and/or to display 845. Platform 801 and/or content services device(s) 848 may be coupled to a network 853 to communicate (e.g., send and/or receive) media information to and from network 853. Content delivery device(s) 849 also may be coupled to platform 801 and/or to display 845.

In embodiments, content services device(s) 848 may include a cable television box, personal computer, network, telephone, Internet enabled devices or appliance capable of delivering digital information and/or content, and any other similar device capable of unidirectionally or bidirectionally communicating content between content providers and platform 801 and/or display 845, via network 853 or directly. It will be appreciated that the content may be communicated unidirectionally and/or bidirectionally to and from any one of the components in system 800 and a content provider via network 853. Examples of content may include any media information including, for example, video, music, medical and gaming information, and so forth.

Content services device(s) 848 receives content such as cable television programming including media information, digital information, and/or other content. Examples of content providers may include any cable or satellite television or radio or Internet content providers. The provided examples are not meant to limit embodiments of the invention.

In embodiments, platform 801 may receive control signals from navigation controller 850 having one or more navigation features. The navigation features of navigation controller 850 may be used to interact with a user interface 854, for example. In embodiments, navigation controller 850 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 850 may be echoed on a display (e.g., display 845) by movements of a pointer, cursor, focus ring, or other visual indicators displayed on the display. For example, under the control of software applications 851, the navigation features located on navigation controller 850 may be mapped to virtual navigation features displayed on user interface 854. In embodiments, navigation controller 850 may not be a separate component but integrated into platform 801 and/or display 845. Embodiments, however, are not limited to the elements or in the context shown or described herein.

In embodiments, drivers (not shown) may include technology to enable users to instantly turn on and off platform 801 like a television with the touch of a button after initial boot-up, when enabled, for example. Program logic may allow platform 801 to stream content to media adaptors or other content services device(s) 848 or content delivery device(s) 849 when the platform is turned "off." In addition, chip set 803 may include hardware and/or software support for 5.1 surround sound audio and/or high definition 7.1 surround sound audio, for example. Drivers may include a graphics driver for integrated graphics platforms. In embodiments, the graphics driver may include a peripheral component interconnect (PCI) Express graphics card.

In various embodiments, any one or more of the components shown in system 800 may be integrated. For example, platform 801 and content services device(s) 848 may be integrated, or platform 801 and content delivery device(s) 849 may be integrated, or platform 801, content services device(s) 848, and content delivery device(s) 849 may be integrated, for example. In various embodiments, platform 801 and display 845 may be an integrated unit. Display 845 and content service device(s) 848 may be integrated, or display 845 and content delivery device(s) 849 may be integrated, for example. These examples are not meant to limit the invention.

In various embodiments, system 800 may be implemented as a wireless system, a wired system, or a combination of both. When implemented as a wireless system, system 800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 800 may include components and interfaces suitable for communicating over wired communications media, such as I/O adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 801 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 8.

Figure 9:
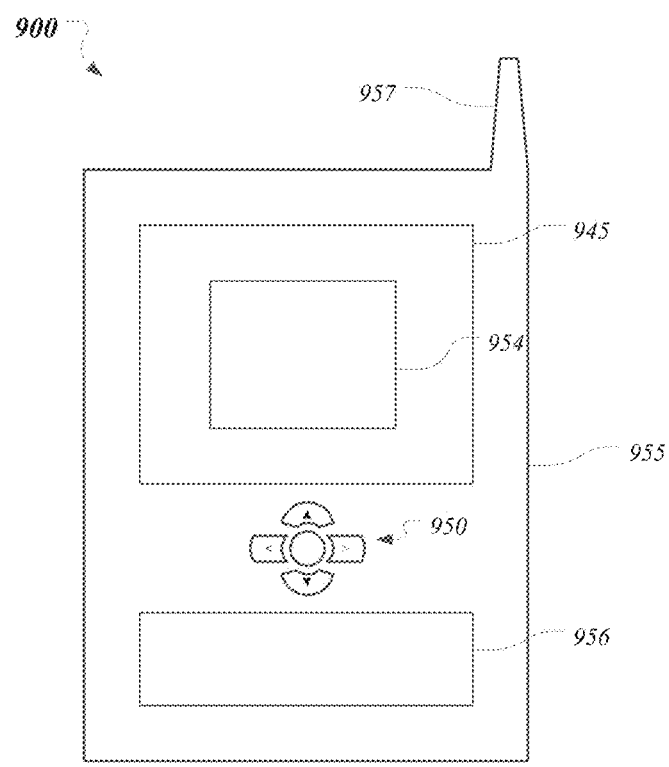
FIG. 9 illustrates one embodiment of a device.

As described above, system 800 may be embodied in varying physical styles or form factors. FIG. 9 illustrates embodiments of a small form factor device 900 in which system 800 may be embodied. In embodiments, for example, device 900 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 9, device 900 may include a display 945, a navigation controller 950, a user interface 954, a housing 955, an I/O device 956, and an antenna 957. Display 945 may include any suitable display unit for displaying information appropriate for a mobile computing device, and may be the same as or similar to display 845 in FIG. 8. Navigation controller 950 may include one or more navigation features which may be used to interact with user interface 954, and may be the same as or similar to navigation controller 850 in FIG. 8. I/O device 956 may include any suitable I/O device for entering information into a mobile computing device. Examples for I/O device 956 may include an alphanumeric keyboard, a numeric keypad, a touch pad, input keys, buttons, switches, rocker switches, microphones, speakers, voice recognition device and software, and so forth. Information also may be entered into device 900 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or rewriteable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments.

Example 1 is at least one machine-readable medium comprising a set of transcoding instructions that, in response to being executed on a computing device, cause the computing device to: determine one or more task characteristics of a transcoding task; determine a set of efficiency values for a set of transcoding nodes based on the one or more task characteristics of the transcoding task, each of the set of efficiency values corresponding to a respective one of the set of transcoding nodes; and assign the transcoding task to one of the set of transcoding nodes based on the set of efficiency values.

In Example 2, the transcoding task of Example 1 may optionally comprise operations to be performed by multiple transcoding engines.

In Example 3, the at least one machine-readable medium of Example 2 may optionally comprise instructions that, in response to being executed on the computing device, cause the computing device to, for each of the set of transcoding nodes: determine a corresponding set of utilization values, each of the set of utilization values associated with a respective one of the multiple transcoding engines; and determine a corresponding efficiency value based on the corresponding set of utilization values.

In Example 4, the at least one machine-readable medium of any one of Examples 1 to 3 may optionally comprise instructions that, in response to being executed on the computing device, cause the computing device to: accumulate utilization information for the set of transcoding nodes while operating in a first mode; determine the set of efficiency values based on the utilization information; and assign the transcoding task to one of the set of transcoding nodes while operating in a second mode.

In Example 5, the utilization information of Example 4 may optionally comprise utilization values for each of multiple transcoding engines of each of the set of transcoding nodes, and each of the set of efficiency values may be determined based on utilization values for each of the multiple transcoding engines of one of the set of transcoding nodes.

In Example 6, the first mode of any one of Examples 4 to 5 may optionally comprise a learning mode, and the second mode may comprise an intelligent assignment mode.

In Example 7, the at least one machine-readable medium of any one of Examples 1 to 6 may optionally comprise instructions that, in response to being executed on the computing device, cause the computing device to determine an efficiency value for a transcoding node based on task characteristics of one or more transcoding tasks undergoing performance on the transcoding node.

In Example 8, the at least one machine-readable medium of any one of Examples 1 to 7 may optionally comprise instructions that, in response to being executed on the computing device, cause the computing device to assign the transcoding task to a transcoding node corresponding to a largest efficiency value among the set of efficiency values.

In Example 9, the transcoding task of any one of Examples 1 to 8 may optionally comprise a video transcoding task.

In Example 10, the transcoding task of Example 9 may optionally comprise a Quick Sync Video transcoding task.

In Example 11, the transcoding task of any one of Examples 9 to 10 may optionally comprise a 1080p to 1080p video transcoding task.

In Example 12, the transcoding task of any one of Examples 9 to 10 may optionally comprise a 1080p to 480p video transcoding task.

In Example 13, the transcoding task of any one of Examples 1 to 12 may optionally comprise operations to be performed in series.

In Example 14, the transcoding task of Example 13 may optionally comprise at least one operation to be performed on a first transcoding engine in series with at least one operation performed on a second transcoding engine.

In Example 15, the transcoding task of Example 7 may optionally be for simultaneous performance with the one or more transcoding tasks undergoing performance on the transcoding node.

Example 16 is a transcoding apparatus, comprising: circuitry; and a transcoding management module for execution on the circuitry to assign a transcoding task to one of a set of transcoding nodes based on a set of task characteristics of the transcoding task and a set of efficiency values for the set of transcoding nodes, each of the set of efficiency values corresponding to a respective one of the set of transcoding nodes.

In Example 17, the transcoding task of Example 16 may optionally comprise operations to be performed by multiple transcoding engines.

In Example 18, the transcoding management module of Example 17 may optionally be for execution on the circuitry to, for each of the set of transcoding nodes, determine a corresponding set of utilization values, each of the set of utilization values associated with a respective one of the multiple transcoding engines, and determine a corresponding efficiency value based on the corresponding set of utilization values.

In Example 19, the transcoding management module of any one of Examples 16 to 18 may optionally be for execution on the circuitry to accumulate utilization information for the set of transcoding nodes while operating in a first mode, determine the set of efficiency values based on the utilization information, and assign the transcoding task to the one of the set of transcoding nodes while operating in a second mode.

In Example 20, the utilization information of Example 19 may optionally comprise utilization values for each of multiple transcoding engines of each of the set of transcoding nodes, and each of the set of efficiency values may be determined based on utilization values for each of the multiple transcoding engines of one of the set of transcoding nodes.

In Example 21, the first mode of any one of Examples 19 to 20 may optionally comprise a learning mode, and the second mode may comprise an intelligent assignment mode.

In Example 22, the transcoding management module of any one of Examples 16 to 21 may optionally be for execution on the circuitry to determine an efficiency value for a transcoding node based on task characteristics of one or more transcoding tasks undergoing performance on the transcoding node.

In Example 23, the transcoding management module of any one of Examples 16 to 22 may optionally be for execution on the circuitry to assign the transcoding task to a transcoding node corresponding to a largest efficiency value among the set of efficiency values.

In Example 24, the transcoding task of any one of Examples 16 to 23 may optionally comprise a video transcoding task.

In Example 25, the transcoding task of Example 24 may optionally comprise a Quick Sync Video transcoding task.

In Example 26, the transcoding task of any one of Examples 24 to 25 may optionally comprise a 1080p to 1080p video transcoding task.

In Example 27, the transcoding task of any one of Examples 24 to 25 may optionally comprise a 1080p to 480p video transcoding task.

In Example 28, the transcoding task of any one of Examples 16 to 27 may optionally comprise operations to be performed in series.

In Example 29, the transcoding task of Example 28 may optionally comprise at least one operation to be performed on a first transcoding engine in series with at least one operation performed on a second transcoding engine.

In Example 30, the transcoding task of Example 22 may optionally be for simultaneous performance with the one or more transcoding tasks undergoing performance on the transcoding node.

Example 31 is a transcoding method, comprising: determining one or more task characteristics of a transcoding task; determining a set of efficiency values for a set of transcoding nodes based on the one or more task characteristics of the transcoding task, each of the set of efficiency values corresponding to a respective one of the set of transcoding nodes; and assigning the transcoding task to one of the set of transcoding nodes based on the set of efficiency values.

In Example 32, the transcoding task of Example 31 may optionally comprise operations to be performed by multiple transcoding engines.

In Example 33, the transcoding method of Example 32 may optionally comprise, for each of the set of transcoding nodes: determining a corresponding set of utilization values, each of the set of utilization values associated with a respective one of the multiple transcoding engines; and determining a corresponding efficiency value based on the corresponding set of utilization values.

In Example 34, the transcoding method of any one of Examples 31 to 33 may optionally comprise: accumulating utilization information for the set of transcoding nodes while operating in a first mode; determining the set of efficiency values based on the utilization information; and assigning the transcoding task to one of the set of transcoding nodes while operating in a second mode.

In Example 35, the utilization information of Example 34 may optionally comprise utilization values for each of multiple transcoding engines of each of the set of transcoding nodes, and each of the set of efficiency values may be determined based on utilization values for each of the multiple transcoding engines of one of the set of transcoding nodes.

In Example 36, the first mode of any one of Examples 34 to 35 may optionally comprise a learning mode, and the second mode may comprise an intelligent assignment mode.

In Example 37, the transcoding method of any one of Examples 31 to 36 may optionally comprise determining an efficiency value for a transcoding node based on task characteristics of one or more transcoding tasks undergoing performance on the transcoding node.

In Example 38, the transcoding method of any one of Examples 31 to 37 may optionally comprise assigning the transcoding task to a transcoding node corresponding to a largest efficiency value among the set of efficiency values.

In Example 39, the transcoding task of any one of Examples 31 to 38 may optionally comprise a video transcoding task.

In Example 40, the transcoding task of Example 39 may optionally comprise a Quick Sync Video transcoding task.

In Example 41, the transcoding task of any one of Examples 39 to 40 may optionally comprise a 1080p to 1080p video transcoding task.

In Example 42, the transcoding task of any one of Examples 39 to 40 may optionally comprise a 1080p to 480p video transcoding task.

In Example 43, the transcoding task of any one of Examples 31 to 42 may optionally comprise operations to be performed in series.

In Example 44, the transcoding task of Example 43 may optionally comprise at least one operation to be performed on a first transcoding engine in series with at least one operation performed on a second transcoding engine.

In Example 45, the transcoding task of Example 37 may optionally be for simultaneous performance with the one or more transcoding tasks undergoing performance on the transcoding node.

In Example 46, at least one machine-readable medium may optionally comprise a plurality of instructions that, in response to being executed on a computing device, cause the computing device to perform a transcoding method according to any one of Examples 31 to 45.

In Example 47, an apparatus may optionally comprise means for performing a transcoding method according to any one of Examples 31 to 45.

In Example 48, a communications device may optionally be arranged to perform a transcoding method according to any one of Examples 31 to 45.

Example 49 is a transcoding system, comprising: circuitry; a transcoding management module for execution on the circuitry to assign a transcoding task to one of a set of transcoding nodes based on a set of task characteristics of the transcoding task and a set of efficiency values for the set of transcoding nodes, each of the set of efficiency values corresponding to a respective one of the set of transcoding nodes; and a transceiver coupled to the circuitry.

In Example 50, the transcoding task of Example 49 may optionally comprise operations to be performed by multiple transcoding engines.

In Example 51, the transcoding management module of Example 50 may optionally be for execution on the circuitry to, for each of the set of transcoding nodes, determine a corresponding set of utilization values, each of the set of utilization values associated with a respective one of the multiple transcoding engines, and determine a corresponding efficiency value based on the corresponding set of utilization values.

In Example 52, the transcoding management module of any one of Examples 49 to 51 may optionally be for execution on the circuitry to accumulate utilization information for the set of transcoding nodes while operating in a first mode, determine the set of efficiency values based on the utilization information, and assign the transcoding task to the one of the set of transcoding nodes while operating in a second mode.

In Example 53, the utilization information of Example 52 may optionally comprise utilization values for each of multiple transcoding engines of each of the set of transcoding nodes, and each of the set of efficiency values may be determined based on utilization values for each of the multiple transcoding engines of one of the set of transcoding nodes.

In Example 54, the first mode of any one of Examples 52 to 53 may optionally comprise a learning mode, and the second mode may comprise an intelligent assignment mode.

In Example 55, the transcoding management module of any one of Examples 49 to 54 may optionally be for execution on the circuitry to determine an efficiency value for a transcoding node based on task characteristics of one or more transcoding tasks undergoing performance on the transcoding node.

In Example 56, the transcoding management module of any one of Examples 49 to 55 may optionally be for execution on the circuitry to assign the transcoding task to a transcoding node corresponding to a largest efficiency value among the set of efficiency values.

In Example 57, the transcoding task of any one of Examples 49 to 56 may optionally comprise a video transcoding task.

In Example 58, the transcoding task of Example 57 may optionally comprise a Quick Sync Video transcoding task.

In Example 59, the transcoding task of any one of Examples 57 to 58 may optionally comprise a 1080p to 1080p video transcoding task.

In Example 60, the transcoding task of any one of Examples 57 to 58 may optionally comprise a 1080p to 480p video transcoding task.

In Example 61, the transcoding task of any one of Examples 49 to 60 may optionally comprise operations to be performed in series.

In Example 62, the transcoding task of Example 61 may optionally comprise at least one operation to be performed on a first transcoding engine in series with at least one operation performed on a second transcoding engine.

In Example 63, the transcoding task of Example 55 may optionally be for simultaneous performance with the one or more transcoding tasks undergoing performance on the transcoding node.

Example 64 is a transcoding apparatus, comprising: means for determining one or more task characteristics of a transcoding task; means for determining a set of efficiency values for a set of transcoding nodes based on the one or more task characteristics of the transcoding task, each of the set of efficiency values corresponding to a respective one of the set of transcoding nodes; and means for assigning the transcoding task to one of the set of transcoding nodes based on the set of efficiency values.

In Example 65, the transcoding task of Example 64 may optionally comprise operations to be performed by multiple transcoding engines.

In Example 66, the transcoding apparatus of Example 65 may optionally comprise: means for, for each of the set of transcoding nodes: determining a corresponding set of utilization values, each of the set of utilization values associated with a respective one of the multiple transcoding engines; and determining a corresponding efficiency value based on the corresponding set of utilization values.

In Example 67, the transcoding apparatus of any one of Examples 64 to 66 may optionally comprise: means for accumulating utilization information for the set of transcoding nodes while operating in a first mode; means for determining the set of efficiency values based on the utilization information; and means for assigning the transcoding task to one of the set of transcoding nodes while operating in a second mode.

In Example 68, the utilization information of Example 67 may optionally comprise utilization values for each of multiple transcoding engines of each of the set of transcoding nodes, and each of the set of efficiency values may be determined based on utilization values for each of the multiple transcoding engines of one of the set of transcoding nodes.

In Example 69, the first mode of any one of Examples 67 to 68 may optionally comprise a learning mode, and the second mode may comprise an intelligent assignment mode.

In Example 70, the transcoding apparatus of any one of Examples 64 to 69 may optionally comprise means for determining an efficiency value for a transcoding node based on task characteristics of one or more transcoding tasks undergoing performance on the transcoding node.

In Example 71, the transcoding apparatus of any one of Examples 64 to 70 may optionally comprise means for assigning the transcoding task to a transcoding node corresponding to a largest efficiency value among the set of efficiency values.

In Example 72, the transcoding task of any one of Examples 64 to 71 may optionally comprise a video transcoding task.

In Example 73, the transcoding task of Example 72 may optionally comprise a Quick Sync Video transcoding task.

In Example 74, the transcoding task of any one of Examples 72 to 73 may optionally comprise a 1080p to 1080p video transcoding task.

In Example 75, the transcoding task of any one of Examples 72 to 73 may optionally comprise a 1080p to 480p video transcoding task.

In Example 76, the transcoding task of any one of Examples 64 to 75 may optionally comprise operations to be performed in series.

In Example 77, the transcoding task of Example 76 may optionally comprise at least one operation to be performed on a first transcoding engine in series with at least one operation performed on a second transcoding engine.

In Example 78, the transcoding task of Example 70 may optionally be for simultaneous performance with the one or more transcoding tasks undergoing performance on the transcoding node.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. At least one machine-readable non-transitory medium comprising a set of instructions that, in response to being executed on a computing device, cause the computing device to:
   determine one or more task characteristics of a transcoding task, the transcoding task comprising operations to be performed by a transcoding node comprising multiple transcoding engines;
   determine, for each of a set of transcoding nodes, a corresponding set of utilization information, each of the set of utilization information associated with utilization levels of a respective one of the multiple transcoding engines attained by performance of two or more transcoding tasks in complement, at least a portion of each of the two or more transcoding tasks to utilize the respective transcoding engine;
   determine a set of efficiency values for the set of transcoding nodes based on the one or more task characteristics of the transcoding task and the utilization information, each of the set of efficiency values to correspond to a respective one of the set of transcoding nodes and to indicate a utilization level associated with performance of the transcoding task and a transcoding task undergoing performance on the respective transcoding node, at least a portion of the transcoding task and a portion of the transcoding task undergoing performance on the respective transcoding node to utilize a same transcoding engine of the respective transcoding node; and
   assign the transcoding task to one of the set of transcoding nodes based on the set of efficiency values.

2. The at least one machine-readable non-transitory medium of claim 1, comprising instructions that, in response to being executed on the computing device, cause the computing device to:
   accumulate utilization information for the set of transcoding nodes while operating in a first mode; and
   assign the transcoding task to one of the set of transcoding nodes while operating in a second mode.

3. The at least one machine-readable non-transitory medium of claim 2, the first mode comprising a learning mode, the second mode comprising an intelligent assignment mode.

4. The at least one machine-readable non-transitory medium of claim 1, comprising instructions that, in response to being executed on the computing device, cause the computing device to determine an efficiency value for a transcoding node based on task characteristics of one or more transcoding tasks undergoing performance on the transcoding node.

5. The at least one machine-readable non-transitory medium of claim 1, comprising instructions that, in response to being executed on the computing device, cause the computing device to assign the transcoding task to a transcoding node corresponding to a largest efficiency value among the set of efficiency values.

6. An apparatus, comprising:
   circuitry; and
   a transcoding management module for execution on the circuitry to:
   assign a transcoding task, the transcoding task comprising operations to be performed by multiple transcoding engines;
   determine a corresponding set of utilization information, each of the set of utilization information associated with utilization levels of a respective one of the multiple transcoding engines attained by performance of two or more transcoding tasks in complement, at least a portion of each of the two or more transcoding tasks to utilize the respective transcoding engine; and
   determine a corresponding efficiency value based on the corresponding set of utilization information, each of the set of efficiency values to correspond to a respective one of a set of transcoding nodes and to indicate a utilization level associated with performance of the transcoding task and, a transcoding tasks undergoing performance on that the respective transcoding node, at least a portion of the transcoding task and a portion of the transcoding task undergoing performance on the respective transcoding node to utilize a same transcoding engine of the respective transcoding node, the assignment of the transcoding task to one of the set of transcoding nodes based on a set of task characteristics of the transcoding task and a set of efficiency values for the set of transcoding nodes.

7. The apparatus of claim 6, the transcoding management module for execution on the circuitry to accumulate utilization information for the set of transcoding nodes while operating in a first mode, determine the set of efficiency values based on the utilization information, and assign the transcoding task to the one of the set of transcoding nodes while operating in a second mode.

8. The apparatus of claim 7, the first mode comprising a learning mode, the second mode comprising an intelligent assignment mode.

9. The apparatus of claim 6, the transcoding management module for execution on the circuitry to determine an efficiency value for a transcoding node based on task characteristics of one or more transcoding tasks undergoing performance on the transcoding node.

10. The apparatus of claim 6, the circuitry coupled to a display.

11. A method, comprising:
determining one or more task characteristics of a transcoding task, the transcoding task comprising operations to be performed by a transcoding node comprising multiple transcoding engines;
determining, for each of the set of transcoding nodes, a corresponding set of utilization information, each of the set of utilization information associated with utilization levels of a respective one of the multiple transcoding engines attained by performance of two or more transcoding tasks in complement, at least a portion of each of the two or more transcoding tasks to utilize the respective transcoding engine;
determining a set of efficiency values for a set of transcoding nodes based on the one or more task characteristics of the transcoding task and the utilization information, each of the set of efficiency value to correspond to a respective one of the set of transcoding nodes and to indicate a utilization level associated with performance of the transcoding task and a transcoding task undergoing performance on the respective transcoding node, at least a portion of the transcoding task and a portion of the transcoding task undergoing performance on the respective transcoding node to utilize a same transcoding engine of the respective transcoding node; and
assigning the transcoding task to one of the set of transcoding nodes based on the set of efficiency values.

12. The method of claim 11, comprising:
accumulating utilization information for the set of transcoding nodes while operating in a first mode;
assigning the transcoding task to one of the set of transcoding nodes while operating in a second mode.

13. The method of claim 12, the first mode comprising a learning mode, the second mode comprising an intelligent assignment mode.

14. The method of claim 11, comprising determining an efficiency value for a transcoding node based on task characteristics of one or more transcoding tasks undergoing performance on the transcoding node.

* * * * *